(12) United States Patent
Tedjini et al.

(10) Patent No.: US 12,393,799 B2
(45) Date of Patent: Aug. 19, 2025

(54) RFID READER AND ASSOCIATED COMPLEMENTARY DEVICE

(71) Applicants: INSTITUT POLYTECHNIQUE DE GRENOBLE, Grenoble (FR); UNIVERSITE GRENOBLE ALPES, Saint Martin D'Heres (FR); UNIVERSITE CLAUDE BERNARD LYON 1, Villeurbanne (FR); INSTITUT NATIONAL DES SCIENCES APPLIQUEES DE LYON, Villeurbanne (FR); ECOLE CENTRALE DE LYON, Ecully (FR); CENTRE NATIONAL DE LA RECHERCHE SCIENTIFIQUE, Paris (FR)

(72) Inventors: Smail Tedjini, Beaumont les Valence (FR); Dahmane Allane, Valence (FR); Yvan Duroc, Valence (FR)

(73) Assignees: INSTITUT POLYTECHNIQUE DE GRENOBLE, Grenoble (FR); UNIVERSITE GRENOBLE ALPES, Saint Martin D'Heres (FR); UNIVERSITE CLAUDE BERNARD LYON 1, Villeurbanne (FR); INSTITUT NATIONAL DES SCIENCES APPLIQUEES DE LYON, Villeurbanne (FR); ECOLE CENTRALE DE LYON, Ecully (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 24 days.

(21) Appl. No.: 18/701,072

(22) PCT Filed: Oct. 11, 2022

(86) PCT No.: PCT/EP2022/078198
§ 371 (c)(1),
(2) Date: Apr. 12, 2024

(87) PCT Pub. No.: WO2023/061984
PCT Pub. Date: Apr. 20, 2023

(65) Prior Publication Data
US 2024/0346263 A1   Oct. 17, 2024

(30) Foreign Application Priority Data
Oct. 13, 2021   (FR) .................................... 2110848

(51) Int. Cl.
G06K 7/10    (2006.01)
H04B 5/45    (2024.01)
H04B 5/20    (2024.01)

(52) U.S. Cl.
CPC ..... G06K 7/10316 (2013.01); G06K 7/10366 (2013.01); H04B 5/45 (2024.01); H04B 5/20 (2024.01)

(58) Field of Classification Search
CPC .......... G06K 7/10316; G06K 7/10366; G06K 19/0726; G06K 7/10019; H04B 5/20; H04B 5/77
See application file for complete search history.

(56) References Cited

U.S. PATENT DOCUMENTS

| | | | |
|---|---|---|---|
| 2008/0079564 A1* | 4/2008 | Shafer | G06K 7/0008 340/539.1 |
| 2010/0188211 A1* | 7/2010 | Brommer | G06K 19/0675 340/539.32 |
| 2015/0288424 A1* | 10/2015 | Tedjini | H04B 5/26 455/41.1 |

FOREIGN PATENT DOCUMENTS

WO   2014072812 A2   5/2014

OTHER PUBLICATIONS

Allane et al., Dahmane, "Characterization of Harmonic Signals Backscattered by Conventional UHF RFID Tags," 2021 IEEE International Conference on RFID Technology and Applications, 2021, pp. 161-164.

(Continued)

*Primary Examiner* — Vernal U Brown
(74) *Attorney, Agent, or Firm* — HAUPTMAN HAM, LLP (57) ABSTRACT

A novel RFID communication device is proposed which allows the detection and electronic processing not only of (Continued)

the response signal backscattered at the fundamental frequency $f_0$ of the reader, but also at least one response signal backscattered at a harmonic frequency, before feeding them to the conventional receive chain of an RFID reader. The joint use of the signal at the fundamental frequency of the reader and at least one signal at a harmonic frequency allows the reader's performance to be improved. The RFID reader can additionally be provided with novel functionalities by virtue of suitable software processing. It is applicable to the field of communications between a reader and passive transponders in UHF RFID and to the field of the Internet of Things.

12 Claims, 5 Drawing Sheets

(56) References Cited

OTHER PUBLICATIONS

Kumar et al., Deepak, "Harmonic RFID Communication Using Conventional UHF System," IEEE Journal of Radio Frequency Identification, vol. 3, No. 4, Dec. 2019, pp. 227-235.

Rao et al., K.V. Seshagiri, "Antenna Design for UHF RFID Tags: a Review and a Practical Application," IEEE Transactions on Antennas and Propagation, vol. 53, No. 12, Dec. 2005, pp. 3870-3876.

Andia Vera et al., Gianfranco, "Exploitation of the nonlinearities in electromagnetic energy harvesting and passive UHF RFID," Wireless Power Transfer, 2016, 3(1), pp. 43-52.

Andia Vera et al., Gianfranco, "Third Harmonic Exploitation in Passive UHF RFID," IEEE Transactions on Microwave Theory and Techniques, vol. 63, No. 9, Sep. 2015, pp. 2991-3004.

Andia Vera et al., Gianfranco, "RFID Test Platform: Nonlinear Characterization," IEEE Transactions on Instrumentation and Measurement, 2014, pp. 1-7.

Andia Vera et al., Gianfranco, "Analysis of Harmonics in UHF RFID Signals," IEEE Transactions on Microwave Theory and Techniques, vol. 61, No. 6, Jun. 2013, pp. 2481-2490.

Allane et al., Dahmane, "Harmonic Power Harvesting System for Passive RFID Sensor Tags," IEEE Transactions on Microwave Theory and Techniques, 2016, pp. 1-10.

International Search Report and Written Opinion issued in corresponding International Application No. PCT/EP2022/078198, mailed Feb. 1, 2023, European Patent Office, Rijswijk, Netherlands, pp. 1-8.

* cited by examiner

RFID READER AND ASSOCIATED COMPLEMENTARY DEVICE

The present application is a U.S. National Phase of International Application Number PCT/EP2022/078198, filed Oct. 11, 2022, which claims priority to French Application No. 2110848, filed Oct. 13, 2021.

TECHNICAL FIELD OF THE INVENTION

The present invention relates to the field of RFID (radio frequency identification) communication systems. It has particularly advantageous applications in the field of communications between a reader and passive RFID UHF transponders and the field of the Internet of Things or IoT).

PRIOR ART

Radio frequency identification (RFID) is a wireless data collection technology which has become very popular in numerous services, logistics, manufacturing and security sectors. An RFID system is composed of at least one reader (or interrogator) and a transponder (or tag) both exchange information in wireless mode. The transponder is generally fixed or linked to an object to be detected or to be monitored. The reader acts as a base station, interacting with the transponder to read or write information.

In the case of passive RFID UHF (ultra-high frequency) transponders, the reader transfers energy wirelessly to the transponder by sending a radiofrequency (RF) power, the transponder of which can benefit, to obtain an electrical power supply to operate and respond to a certain frequency by using the backscattering modulation technique. The passive RFID UHF transponder amounts to an antenna charged by a chip (integrated circuit). One of the tasks that the chip can perform is a rectification, function by which the chip obtains energy to operate as a transponder. A rectifier then converts the alternating current generated by the RF waves sent by the direct current reader making it possible for the chip to perform the rest of its functions as a transponder. The architecture of the rectifier is generally based on a Cockcroft-Walton-type circuit with two or more diode voltage doubler stages. The presence of these diodes determines the non-linear performance of the chip. Another task of the chip is to generate a response signal to the reader by using the backscattering modulation technique. This task is also performed by non-linear components, such as transistors.

It will be noted that, in the present application, the expression "passive RFID transponder" also means a so-called semi-passive RFID transponder, the latter being able to communicate exactly in the same way as a passive RFID transponder, but with a different energy source, alternative or complementary, relative to that which constitutes the radiofrequency (RF) power received, to make it possible to improve the scope of reading and/or enable additional functionalities. Thus, in the present application, the expression "passive RFID transponder" also comprise an RFID transponder which uses the backscattering modulation technique to communicate with the reader, but the chip of which is powered by another energy source such as a battery incorporated in the transponder or any other device utilising an external energy source such as a photovoltaic or vibratory source, for example. Such transponders are also called "battery-assisted passive tags" or "semi-passive tags", and correspond to class 3 transponders, according to the EPC global standardisation organisation. In these types of passive RFID transponders, the chip does not need to comprise a rectifier to obtain a continuous power supply from the RF signal emitted by the reader.

The non-linear performance of the chip generates harmonic signals which are backscattered by the antenna of the tag. Until recently, the presence of these backscattered harmonics was not utilised, i.e. that the reader and the transponder were designed to only process the fundamental frequency and not the harmonics.

RFID communication systems can be designed to process, not only the fundamental frequency, but also the harmonics. Such an RFID communication system is, for example, considered in patent document WO2014072812 A2 which proposes to utilise the presence of harmonics in the response signal of the transponders. When the signal to the interrogation frequency of the reader and that to the harmonic frequency have the same information, a redundancy is acquired, which makes it possible to improve the quality of the communication, for example, by the processing of possible transmission errors. In another vision, the signals to the interrogation frequency and to the harmonic frequency can be used to communicate different information, for example, an identification code via the signal to the interrogation frequency and sensor measuring data via the signal to the harmonic frequency.

It is moreover known, from the article by Kumar et al. entitled "Harmonic RFID Communication Using Conventional UHF System", and published in the journal, *IEEE Journal of Radio Frequency Identification* (vol. 3, no. 4, pp. 227-235) in December 2019, an additional RF interface between a conventional RFID reader and an RFID transponder. This interface is designed to receive the harmonic signal backscattered by the RFID transponder and to convert the part of the signal linked to the third harmonic backscattered at the fundamental frequency of the system to return the converted signal to the conventional RFID reader so as to be able to extract the information carried by the signal of the third backscattered harmonic. This interface is however limited to a use with an RFID transponder, specially designed to have an increase radiative effectiveness for the third harmonic. The interface proposed by Kumar et al. does not make it possible to extract the information contained in the harmonic signal backscattered by a conventional RFID transponder. Furthermore, only non-conventional RFID transponders, specially designed to operate at the harmonic frequency, can be utilised by the reader according to Kumar.

Despite these recent developments, given the relative amplitudes of the interrogation and response signals and reflection phenomena generated by the environment, a so-called glare effect subsists, which limits the reading performance. These reflections are present in application environments of the RFID, and are very severe in the presence of metal and water, and in high humidity rate media.

An aim of the present invention is therefore to propose an RFID communication system, which makes it possible to overcome at least one of the disadvantages of the prior art.

More specifically, an aim of the present invention is to propose an RFID communication system:
  which makes it possible to process both the response of a transponder at the fundamental interrogation frequency and the response of the transponder to at least one harmonic frequency, and/or
  the use of which does not require the development of new transponders, and/or
  the reading performance of which is not limited, to say the least significantly, by the abovementioned glare effect, and/or which makes it possible to equip the RFID reader with new functionalities, thanks to suitable electronic and computerised processing.

Other aims, features and advantages of the present invention will appear upon examining the description below and the accompanying drawings. It is understood that other advantages can be incorporated.

SUMMARY OF THE INVENTION

To achieve at least one of these aims, according to a first aspect of the invention, a complementary communication device is provided, intended to be coupled to an RFID reader operating at a fundamental frequency $f_0$, the complementary device being mainly such that it comprises:

An RF antenna for receiving, in response to a interrogation signal emitted at the fundamental frequency $f_0$ by the RFID reader, a response signal backscattered at a harmonic frequency by a transponder, the response signal backscattered at a harmonic frequency being at the frequency $n \times f_0$ where n is an integer defining the order of the harmonic considered, A first electronic circuit intended to be arranged at the output of the RFID reader to take an image from said interrogation signal, A second electronic circuit, operationally connected to the first electronic circuit, to generate a signal at the frequency $(n-1) \times f_0$ from the image of the interrogation signal, and A third electronic circuit, operationally connected to the second electronic circuit and to the RF antenna of the complementary device, to generate a backscattered signal converted downwards, from the response signal backscattered at the harmonic frequency $n \times f_0$ and according to the signal at the frequency $(n-1) \times f_0$ generated beforehand, the backscattered signal converted downwards being generated, so as to be returned to the fundamental frequency $f_0$ and being intended to be injected, directly or indirectly, at the input of the RFID reader for processing, such that the RFID reader can extract information carried by the backscattered response signal.

Thus, it is made possible for the RFID reader equipped with the complementary device such as introduced above, to detect the harmonic signals retro-modulated by the interrogated RFID transponders, and to process them to make them utilisable directly by any RFID reader. It is subsequently made possible to equip any RFID reader with new functionalities thanks to suitable electronic and/or computerised processing, by equipping it with the complementary device such as introduced above.

Optionally, the complementary device such as introduced above can further comprise, when the backscattered signal converted downwards is intended to be injected indirectly at the input of the RFID reader for processing, an electronic combiner, operationally connected to the third electronic circuit and intended to be arranged at the input of the RFID reader to:

receive, from an RF antenna of the RFID reader, a response signal backscattered at the fundamental frequency $f_0$ by the interrogated transponder, combine the response signal backscattered at the fundamental frequency $f_0$ and the backscattered signal converted downwards, and inject the signal resulting from the combination at the input of the RFID reader for processing.

A second aspect of the invention relates to an RFID reader, preferably an ultra-high frequency (UHF) RFID reader, operating at the fundamental frequency $f_0$ and comprising a complementary RFID communication device such as introduced above to enable the detection and the processing of at least one harmonic signal backscattered by an interrogated RFID transponder, so as to extract information from it, carried by the backscattered harmonic signal.

A third aspect of the invention relates to an RFID communication system comprising an RFID reader according to the second aspect of the invention and a plurality of RFID transponders. The RFID transponders of the plurality can be conventional RFID transponders on the market.

BRIEF DESCRIPTION OF THE FIGURES

The aims, objectives, as well as the features and advantages of the invention will best emerge from the detailed description of an embodiment of the latter, which is illustrated by the following accompanying drawings, wherein.

The drawings are given as examples and are not limiting of the invention. They constitute principle schematic representations intended to facilitate the understanding of the invention.

DETAILED DESCRIPTION OF THE INVENTION

Before starting a detailed review of embodiments of the invention, below optional features are stated which can optionally be used in association or alternatively:

According to an example, the electronic combiner is configured for a weighted combination in module and/or in phase of the response signal backscattered at the fundamental frequency $f_0$ and of the backscattered signal converted downwards.

Alternatively to the preceding example, the electronic combiner is configured for a combination alternately from the response signal backscattered at the fundamental frequency $f_0$ and from the backscattered signal converted downwards.

According to an example, the response signal backscattered at the fundamental frequency $f_0$ and the response signal backscattered at the harmonic frequency $n \times f_0$ carries the same information.

According to an example, the first electronic circuit comprises an electronic coupler.

According to an example, the second electronic circuit successively comprises:

An electronic frequency multiplier operationally connected to an output of the first electronic circuit and configured to multiply the frequency of the image of the interrogation signal by a factor equal to n−1, An electronic amplifier to amplify the image of the interrogation signal such as multiplied before, A bandpass filter configured to filter the image of the interrogation signal such as multiplied and amplified before by letting a frequency interval pass, centred on the frequency $(n-1) \times f_0$, and A bandstop filter configured to filter the image of the interrogation signal such as multiplied, amplified and filtered before, by not letting a frequency interval pass, centred on the fundamental frequency $f_0$.

According to an example, the third electronic circuit comprises, at the output, an electronic amplifier to amplify the output signal of the third electronic circuit, an output of the electronic amplifier being intended to be connected, directly or indirectly, at the input of the RFID reader. The complementary device thus makes it possible to raise the level of the backscattered signal converted downwards before being injected at the input of the RFID reader for processing.

According to another example, alterative or complementary to the preceding example, the third electronic circuit comprises a bandpass filter configured to filter the signal crossing it by letting a frequency interval pass, centred on the fundamental frequency $f_0$. The complementary device thus makes it possible to prevent the transposition of the ambient 4G LTE frequencies in the frequency band dedicated to the RFID UHF (whether ETSI (European Telecommunications Standards Institute) or FCC (Federal Communications Commission).

According to the two preceding examples, the third electronic circuit successively comprises:

A low-noise electronic amplifier operationally connected to the RF antenna of the complementary device and configured to amplify the response signal backscattered at the harmonic frequency $n \times f_0$, A bandpass filter configured to filter the response signal backscattered at the harmonic frequency $n \times f_0$ such as amplified before by letting a frequency interval pass, centred on the frequency $n \times f_0$, A bandstop filter configured to filter the response signal backscattered at the harmonic frequency $n \times f_0$ such as amplified and filtered before by not letting a frequency interval pass, centred on the fundamental frequency $f_0$, An electronic mixer operationally connected to an output of the second electronic circuit and configured to combine the response signal backscattered at the harmonic frequency $n \times f_0$ such as amplified and double filtered before, and the image of the interrogation signal such as multiplied, amplified and filtered before by the second electronic circuit, The bandpass filter configured to filter the output signal of the electronic mixer, and The electronic amplifier to amplify the output signal of the electronic mixer such as filtered before.

According to an example, the integer n is equal to 3, such that the harmonic frequency $n \times f_0$ corresponds to the harmonic third backscattered signal.

According to an example, each backscattered signal is more specifically a retro-modulated signal.

According to an example, the complementary device further comprises at least one electronic circulator. More specifically, the complementary device comprises at least two circulators, preferably three circulators, from among:

at least one first circulator arranged upstream from the first electronic circuit and intended to be connected, directly or indirectly, at the input of the RFID reader, and at least one second circulator, preferably two circulators, connected in series, arranged downstream from the first electronic circuit and intended to be connected, directly or indirectly, to an RF antenna of the RFID reader.

The present patent application relates to a new radiofrequency system for detecting and for processing signals generated by retro-modulation by the transponders interrogated by an RFID reader.

Figure 2:
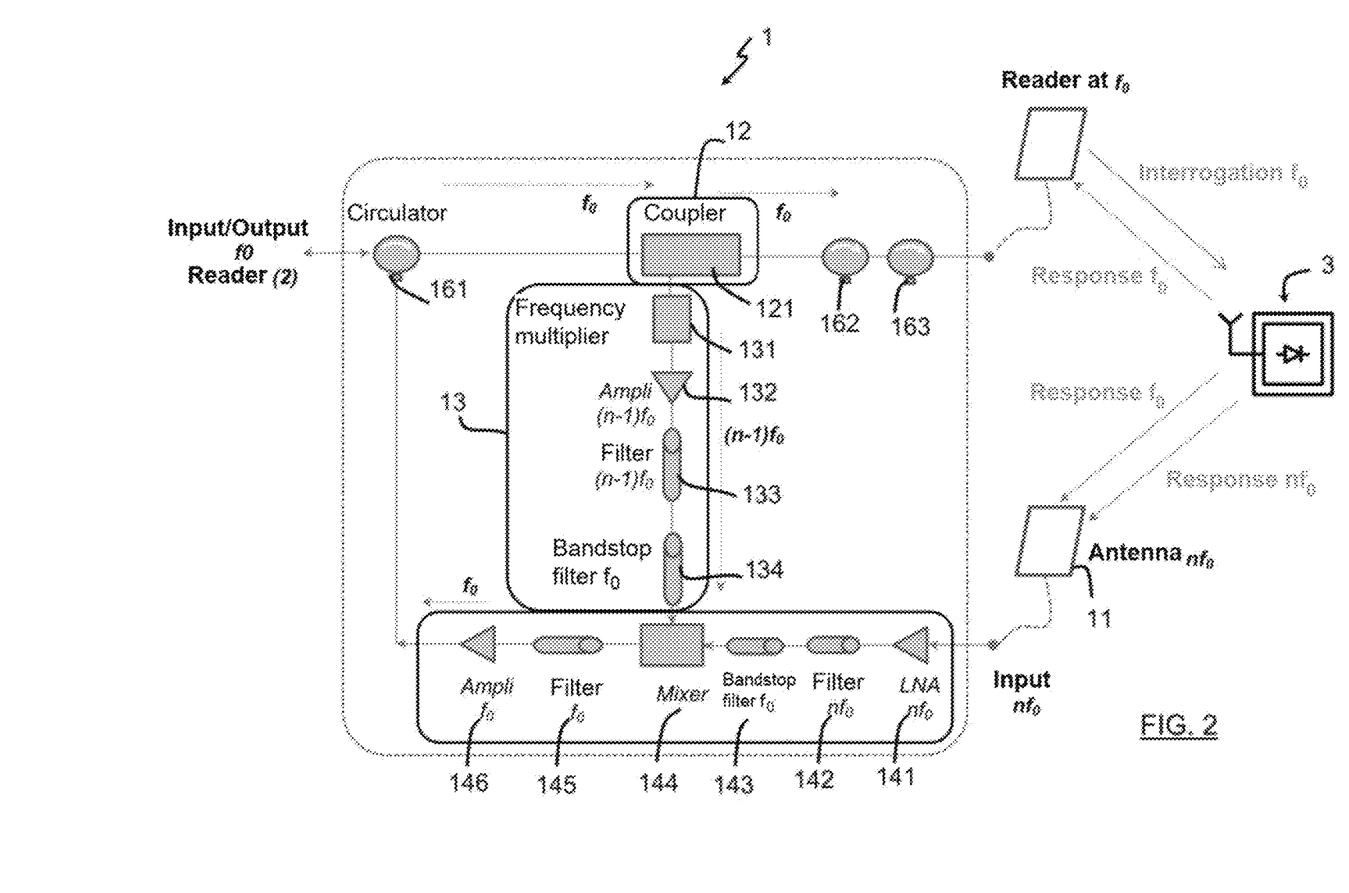
FIG. 2 represents an example of electronic architecture of a complementary device according to the first aspect of the invention which can be inserted in an RFID reader.

In reference to FIG. 2, in the case of the RFID UHF, when the transponders 3 are interrogated (see "Interrogation $f_0$") by the RFID reader 2, they generate a retro-modulated signal (see "Response $f_0$") at the interrogation frequency $f_0$ of the reader. It has been demonstrated that they also generate signals at the harmonic frequencies of significant power (see "Response $nf_0$"), in particular, for the first harmonics of orders 2 and 3.

The aim, in this case, is to utilise the presence of these harmonics by a specific RF material architecture, enabling the detection and the electronic processing, not only of the response signal backscattered at the fundamental frequency $f_0$ (see "Response $f_0$"), but also of at least one response signal backscattered at a harmonic frequency (see "Response $nf_0$"), before injecting them into the traditional receiving chain of an RFID reader 2. The joint use of the signal at the fundamental frequency (see "Response $f_0$") of the reader 2 and of the signals at the harmonic frequencies (see "Response $nf_0$") makes it possible to improve the performance of the reader 2, such as quantified, for example, by the reading rate or the binary error rate in the presence of noise. Moreover, adding the complementary device 1 according to the first aspect of the invention to a conventional RFID reader 2 opens the route for equipping the conventional reader with new functionalities, thanks to suitable software processing.

More specifically, the first aspect of the invention relates to a complementary device 1 intended to equip an RFID reader 2 that the latter is conventional or in the process of being designed.

Figure 1:
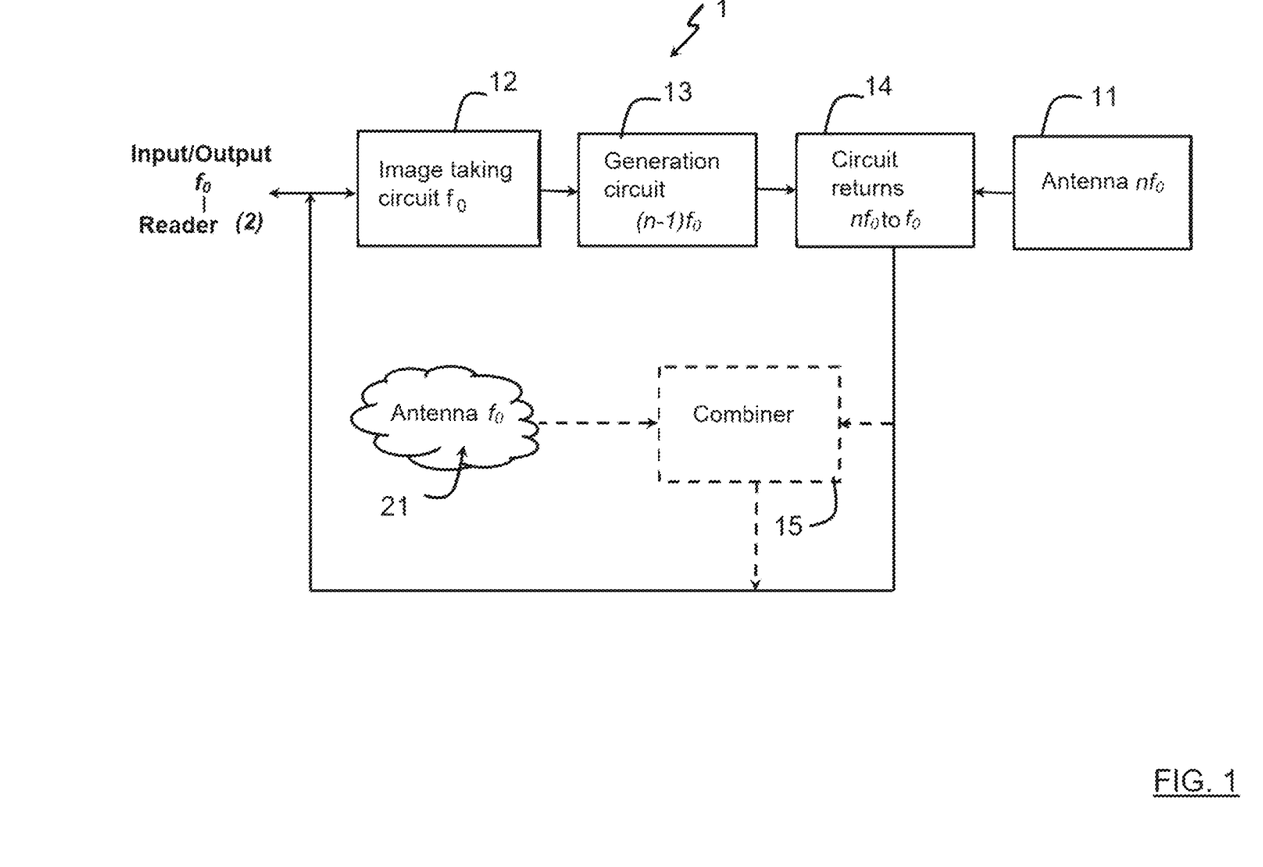
FIG. 1 represents an operational diagram of the electronic circuits of a complementary device according to the first aspect of the invention which can be inserted in an RFID reader.

The complementary device 1 according to the first aspect of the invention has an RF antenna 11 and electronic circuits 12, 13 and 14 which can be inserted in an RFID reader, in a connected manner to the other electronic components of the RFID reader, and arranged together according to an operational diagram such as represented in FIG. 1.

More specifically, the complementary device 1 comprises:

An RF antenna 11 to receive, in response to an interrogation signal (see "Interrogation $f_0$") emitted at the fundamental frequency $f_0$ by the RFID reader 2, a response signal backscattered at a harmonic frequency (see "Response $nf_0$") by a transponder 3, A first electronic circuit 12 intended to be arranged at the output of the RFID reader 2 to take an image of said interrogation signal, A second electronic circuit 13, operationally connected to the first electronic circuit 12, to generate a signal at the frequency $(n-1) \times f_0$ from the image of the interrogation signal, and A third electronic circuit 14, operationally connected to the second electronic circuit 13 and to the RF antenna 11 of the complementary device 1, to generate a backscattered signal converted downwards, from the response signal backscattered at the harmonic frequency n×f$_0$ and according to the signal at the frequency (n−1)×f$_0$ generated before.

On the one hand, the response signal backscattered at a harmonic frequency is at the frequency n×f$_0$ where n is an integer defining the order of the harmonic considered.

On the other hand, the backscattered signal converted downwards is generated so as to be returned to the fundamental frequency f$_0$ and is intended to be injected, directly or indirectly, at the input of the RFID reader 2 for processing. In this case, a frequency translation is often referred to.

When the backscattered signal converted downwards is intended to be injected directly at the input of the RFID reader 2 for processing, the operational diagram of the complementary device 1 does not necessarily comprise an electronic combiner 15 and the signal to be processed directly crosses from the third electronic circuit 14 to the input of the RFID reader 2. The electronic components and the connection lines represented as long dashes in FIG. 1 indicate their optionality in the operational diagram of the complementary device 1. On the other hand, the RF antenna 21 has been represented in a cloud to illustrate the fact that it does not belong to the complementary device 1, but to the RFID reader 2.

Figure 4:
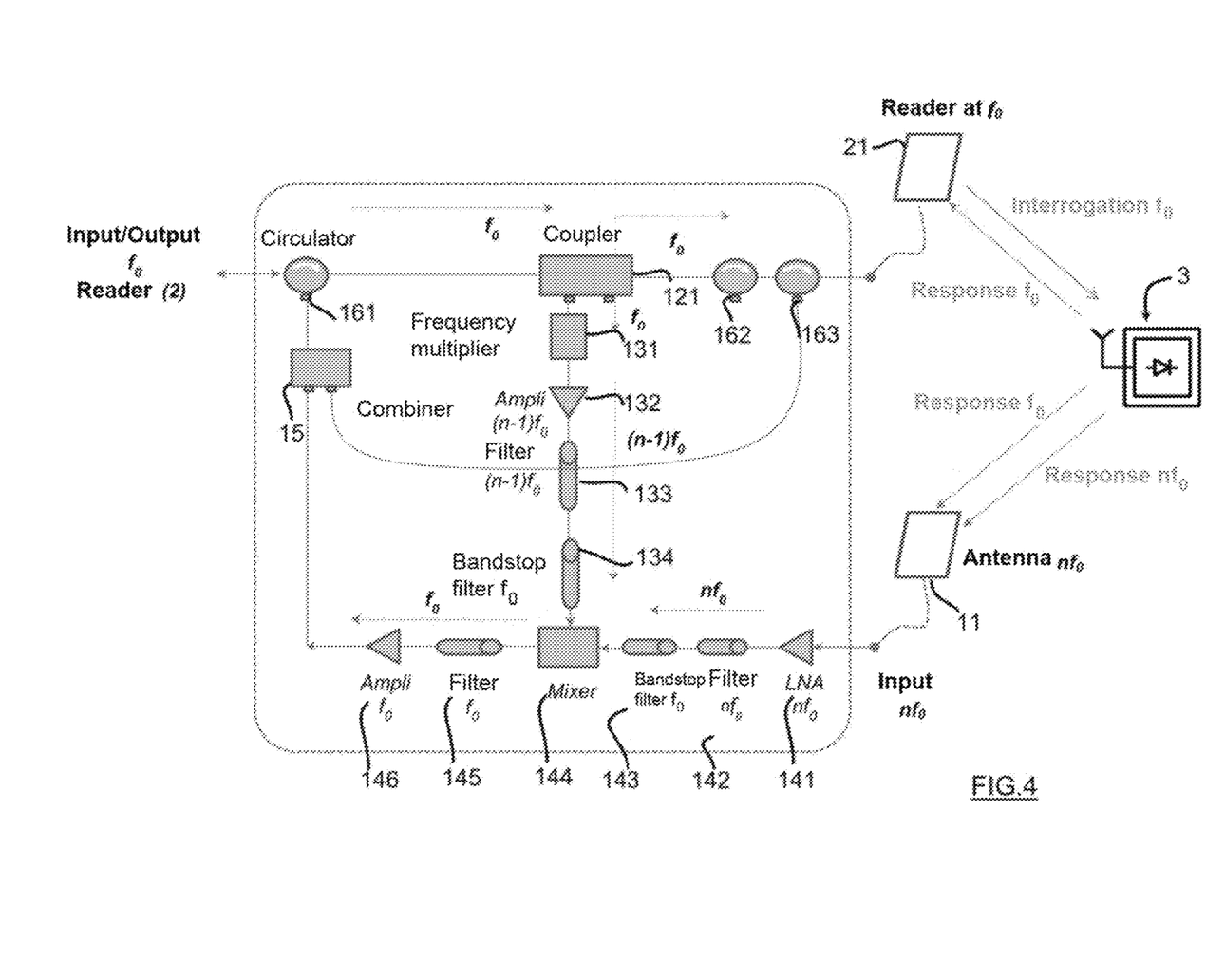
FIG. 4 represents a variant of the example of FIG. 2 comprising an electronic combiner.

It is when the backscattered signal converted downwards is intended to be injected indirectly at the input of the RFID reader 2 for its processing, that an electronic combiner 15, operationally connected to the third electronic circuit 14 and intended to be arranged at the inlet of the RFID reader 2 is provided to:

receive, from an RF antenna 21 of the RFID reader 2, a response signal backscattered at the fundamental frequency f$_0$ by the interrogated transponder 3 (the signal can thus be more particularly available on the output 163 illustrated in FIG. 4), combine together, the response signal backscattered at the fundamental frequency f$_0$ and the backscattered signal converted downwards, and inject the signal resulting from the combination at the input of the RFID reader 2 for its processing.

Two different methods are considered to combine between the response signal backscattered at the fundamental frequency f$_0$ and the backscattered signal converted downwards. The choice of either of these methods can be fixed by the user.

According to the first of the two methods considered, the electronic combiner 15 is configured for a weighted combination in module and/or in phase of the response signal backscattered at the fundamental frequency f$_0$ and of the backscattered signal converted downwards.

According to the second of the two methods considered, the electronic combiner 15 is configured for a combination by alternating of the response signal backscattered at the fundamental frequency f$_0$ and of the backscattered signal converted downwards.

Whatever the method implemented, it is understood that the variant of the complementary device 1 comprising an electronic combiner 15 makes it possible to increase, or at the very least test, the robustness with which the complementary device detects and processes the harmonic considered.

In this case, it is noted that, once injected at the input of the RFID reader 2, the signal to be processed is done in a potentially standard manner, i.e. in the way of which a conventional RFID reader on the market processes any input signal.

At this stage of the description, it is understood that the RFID reader 2 according to the second aspect of the invention can be a conventional RFID reader on the market to which the complementary device 1 has been added, according to the first aspect of the invention or an RFID reader which, from its design, comprises the complementary device 1 according to the first aspect of the invention. In view of the large number of RFID readers already deployed throughout the world, it is interesting that the present invention proposes a solution making it possible to "modernise" these RFID readers already deployed, without requiring the replacement, but simply the addition to their electronic architecture of the electronic components of the complementary device 1 according to the first aspect of the invention. The second aspect of the present invention covers these two options.

In reference to FIG. 2, an embodiment of each from among the first, second and third electronic circuits 12, 13 and 14 will be described below.

The first electronic circuit 12 can comprise, even consist of, an electronic coupler 121. In this case, it is noted that, on either side of the first electronic circuit 12, at least two, even three, electronic circulators 161, 162 and 163 can be provided.

From among these three electronic circulators, the following are found, in FIG. 2:

a first circulator 161 arranged upstream from the first electronic circuit 12 and intended to be connected, directly or indirectly, at the input of the RFID reader 2, and two circulators 162 and 163 connected in series, arranged downstream from the first electronic circuit 12 and intended to be connected, directly or indirectly, to an RF antenna 21 of the RFID reader 2.

According to the example illustrated in FIG. 2, the second electronic circuit 13 can successively comprise:

An electronic frequency multiplier 131 operationally connected to an output of the first electronic circuit and configured to multiply the frequency of the image of the interrogation signal by a factor equal to n−1, An electronic amplifier 132 to amplify the image of the interrogation signal such as multiplied before, A bandpass filter 133 configured to filter the image of the interrogation signal such as multiplied and amplified before by letting a frequency interval pass, centred on the frequency (n−1)×f$_0$, and A bandstop filter 134 configured to filter the residue of the signal at the fundamental frequency coming from the image of the interrogation signal such as multiplied, amplified and filtered before, to not let a frequency interval pass, centred on the fundamental frequency f$_0$.

Figure 5:
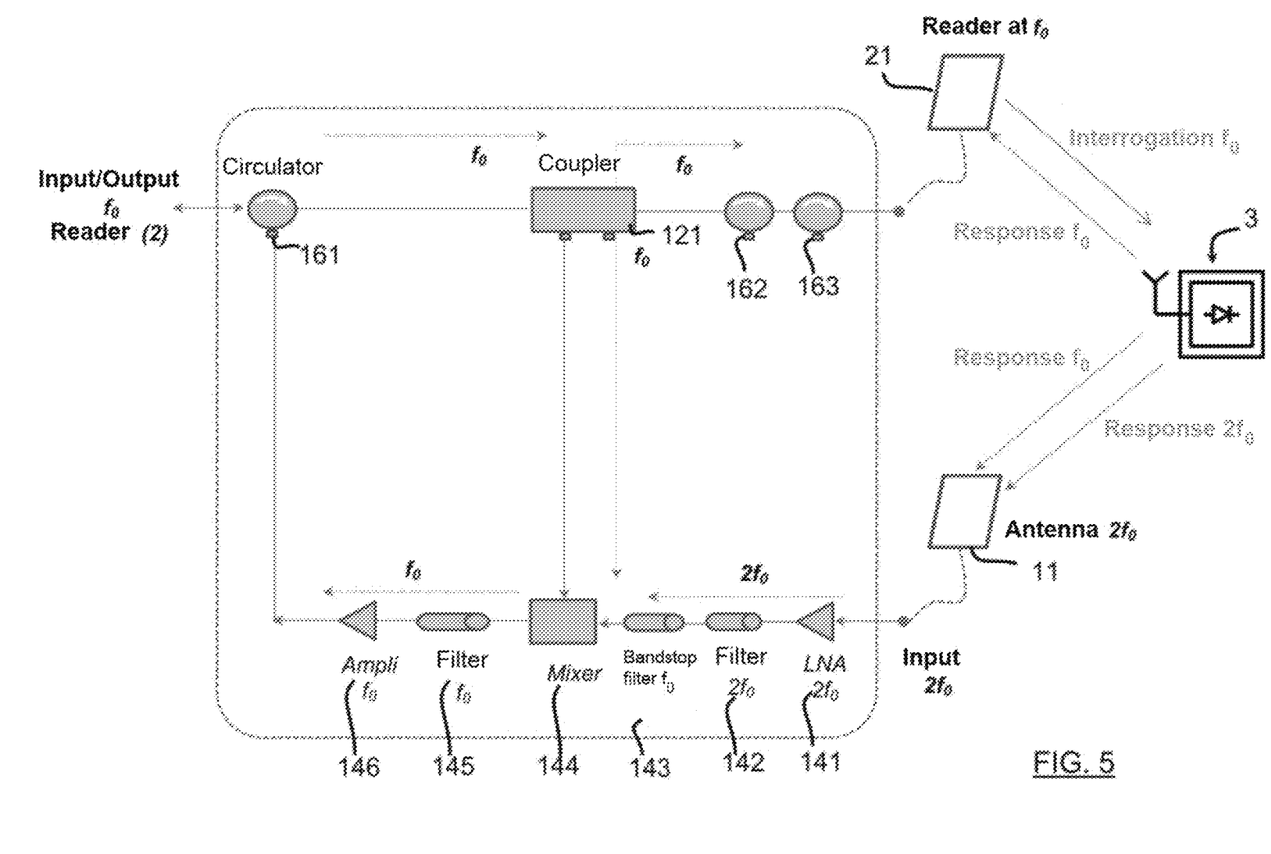
FIG. 5 represents the example of FIG. 2 configured to detect and process the second harmonic of the signal retro-modulated by an RFID transponder.

Other electronic diagrams of the second electronic circuit 13 can, if necessary, be considered. These other diagrams, for example, implement the same electronic functions as those of the different components 131 to 134 listed above, but in a different order and/or with an adaptation of said functions which are deemed to come from the ordinary abilities of a person skilled in the art. For example, as soon as n>2, obtaining the frequency (n−1)×f$_0$ can require such an adaptation. Furthermore, such other electronic diagrams can enable the implementation of other, in particular, filtration, multiplication and/or amplification functions, alternatively or in addition to the electronic functions of the different components 131 to 134 listed above. Moreover, it is noted that, to receive an RF signal at the harmonic frequency 2f$_0$, the multiplier 131 is not necessary. In this case, and as illustrated in FIG. 5, the second electronic circuit 13 can even be reduced to a single connecting wire between an output of the electronic coupler 121 and an input of the electronic mixer 144.

The third electronic circuit 14 comprises at least one from among a bandpass filter 145 and an electronic amplifier 146.

The third electronic circuit 14 can indeed comprise the abovementioned bandpass filter 145. The latter is thus configured to filter the signal passing through it by letting a frequency interval pass, centred on the fundamental frequency $f_0$. The complementary device 1 thus makes it possible to prevent the transposition of the ambient 4G LTE frequencies in the frequency band dedicated to the RFID UHF method (whether ETSI or FCC). Interferences are thus avoided between the 4G LTE communication techniques and the RFID (preferably UHF) communication technique implemented in the case of the present invention, such interferences being all the more to process than the application environment of the RFID communication system can induce very severe signal reflections, for example, in the presence of metal and water, and in media with a high humidity rate.

Alternatively or complementarily, the third electronic circuit 14 can comprise, at the outlet, the abovementioned electronic amplifier 146, the latter is configured to amplify the output signal of the third electronic circuit 14. An output of the electronic amplifier 146 is thus intended to be connected, directly or indirectly, at the input of the RFID reader 2. The complementary device 1 thus makes it possible to raise the level of the backscattered signal converted downwards before being injected at the input of the RFID reader 2 for its processing.

More specifically, the third electronic circuit 14 successively comprises, according to its embodiment illustrated in FIG. 2:

- A low noise electronic amplifier 141 operationally connected to the RF antenna 11 of the complementary device 1 and configured to amplify the response signal backscattered at the harmonic frequency $n \times f_0$,
- A bandpass filter 142 configured to filter the response signal backscattered at the harmonic frequency $n \times f_0$ such as amplified before by letting a frequency interval pass, centred on the frequency $n \times f_0$,
- A bandstop filter 143 configured to filter the response signal backscattered at the harmonic frequency $n \times f_0$ such as amplified and filtered before by not letting a frequency interval pass, centred on the fundamental frequency $f_0$,
- An electronic mixer 144 operationally connected to an output of the second electronic circuit 13 and configured to combine the response signal backscattered at the harmonic frequency $n \times f_0$ such as amplified and double filtered before, and the image of the interrogation signal such as multiplied, amplified and filtered before by the second electronic circuit 13,
- The bandpass filter 145 configured to filter the output signal of the electronic mixer 144, and
- The electronic amplifier 146 to amplify the output signal of the electronic mixer 144 such as filtered before.

The use of the bandstop filter 143 makes it possible to annul all interfering components at the frequency $f_0$, that emitted by the RFID reader 2 (around 1 watt) and/or that coupled on the path $n\,f_0$ (around a few tens of nanowatts) coming from the retro-modulation of the transponder 3 at the frequency $f_0$.

Indeed, the level of the signals $f_0$ emitted by the RFID reader 2, as well as that of the signals generated by retro-modulation by the transponder 3, are a lot higher than the level of the signal at the harmonic frequency $n\,f_0$ generated by the transponder 3. The third electronic circuit 14, thanks, in particular, to its bandstop filter 143, thus has the advantage of ensuring that the backscattered signal converted downwards, generated by the third electronic circuit 14 and intended to be injected at the input of the RFID reader 2, is not, or is a lot less, affected by the inescapable presence of the higher level signals. A satisfactory quality of reading the information carried by the response signal backscattered at the harmonic frequency $n \ast f_0$ is thus ultimately ensured.

Figure 3:
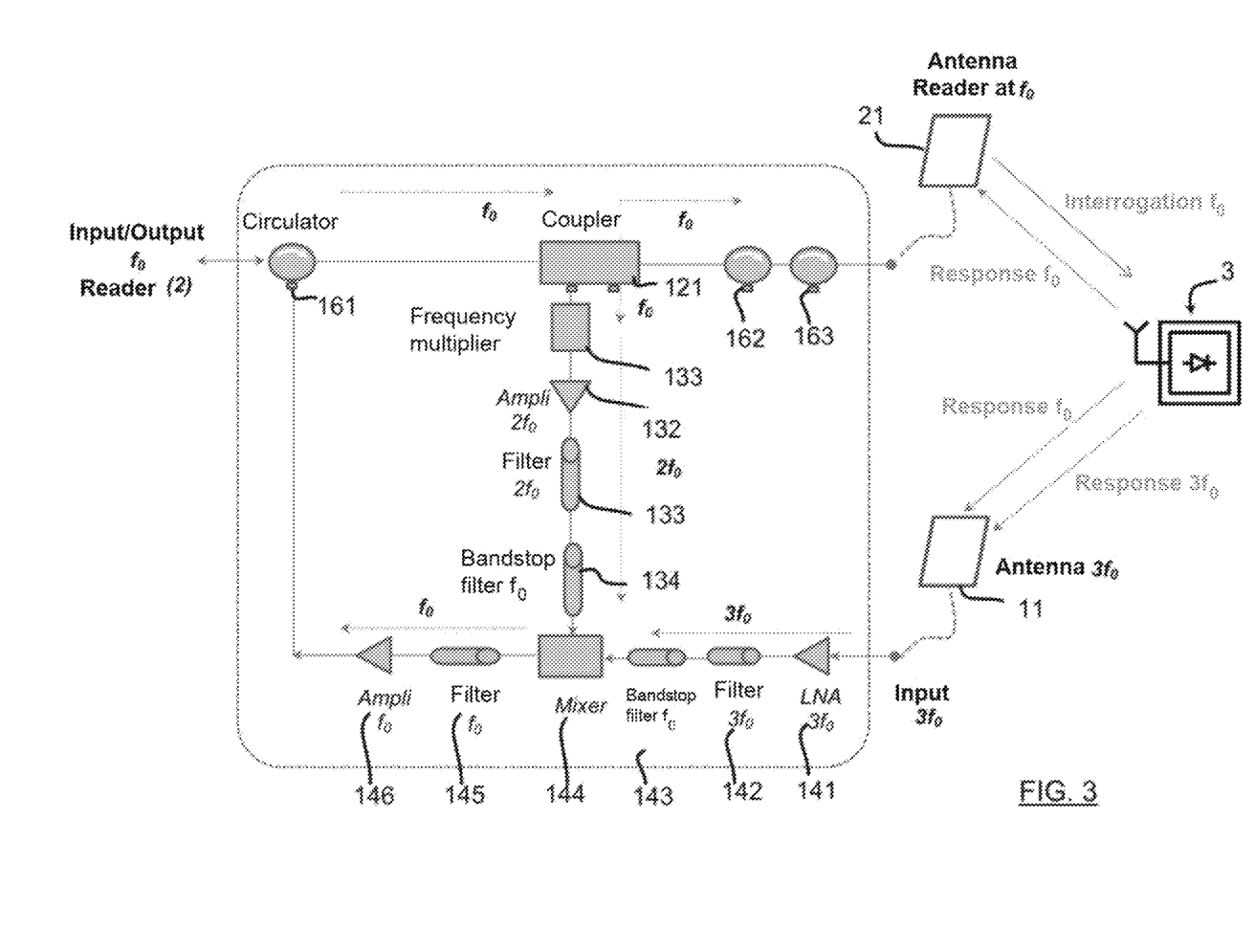
FIG. 3 represents the example of FIG. 2 configured to detect and process the third harmonic of the signal retro-modulated by an RFID transponder.

FIG. 3 illustrates nothing other than the electronic architecture represented in FIG. 2 for a value of the integer n is equal to 3, such that the harmonic frequency $n \times f_0$ corresponds to the third harmonic backscattered signal.

FIG. 4 illustrates nothing other than the electronic architecture represented in FIG. 2, to which has been added, suitably, the electronic combiner 15 such as described above in reference to FIG. 1. It is observed, in FIG. 4, that a first input of the combiner 15 is directly connected to the output of the third electronic circuit 14 and that a second input of the combiner 15 is connected to the RF antenna 21 of the RFID reader 2, if necessary, by way of an electronic circulator such as the abovementioned electronic circulator 163; the output of the combiner 15 is itself connected to the input of the RFID reader 2, if necessary, by way of an electronic circulator such as the abovementioned electronic circulator 161.

As introduced above, a third aspect of the invention relates to an RFID communication system comprising an RFID reader 2 according to the second aspect of the invention and a plurality of RFID transponders 3. As mentioned in the introduction, the invention is particularly suitable for an implementation in the scope of communication technology, known as RFID UHF. Thus, the RFID transponders 3 of the abovementioned plurality are preferably RFID UHF transponders. Moreover, the present invention makes it possible to utilise the harmonic signals of the RFID transponders, whatever their design. These can thus advantageously be conventional RFID transponders on the market, and not necessarily RFID transponders specially designed to enable a utilisation of the harmonic signals.

Thanks to the joint utilisation of the retro-modulated signals by the RFID, preferably UHF transponders, at the fundamental frequency and at the harmonic frequencies, utilisation made possible by the complementary device 1 described above, it is made possible to consider new functionalities for the RFID reader 2 comprising said complementary device 1. From among these new functionalities, the following can be mentioned:

- Reading RFID transponders 3 in geographic zones specific even to the inside of a reading field of the reader 2 traditionally used, by using specific antennas;
- Reading several pieces of information at the same time: identifier of each RFID transponder 3, but also any other type of data coming from each RFID transponder 3 (for example, capture of information, such as temperature, humidity, vibration, etc.) by utilising harmonic frequency channels.

Thus, if it is considered that the response signal backscattered at the fundamental frequency $f_0$ and the response signal backscattered at the harmonic frequency $n \times f_0$ carry the same information, which seems necessary when the second abovementioned method is implemented for the electronic combiner 15, it is not excluded, that these signals carry different information between them; the latter option being, for example, compatible with the implementation of the first abovementioned method for the electronic combiner 15.

The invention is not limited to the embodiments described above and extends to all the embodiments covered by the claims.

In particular, it is considered that, a first complementary device and a second complementary device, one specific to a harmonic order different from the other, is intended to equip the RFID reader. A switch arranged in the first and second complementary devices can be configured to enable the RFID reader to alternatively utilise the harmonic of a given order, then the other. Alternatively, it is considered that the harmonics of the two different orders between them are utilised jointly.

The invention claimed is:

1. A complementary RFID communication device configured to be coupled with an RFID reader operable at a fundamental frequency $f_0$, the complementary device comprising:
RF antenna to receive, in response to an interrogation signal emitted at the fundamental frequency $f_0$ by the RFID reader, a response signal backscattered at a harmonic frequency by a transponder, the response signal backscattered at a harmonic frequency being at the frequency $n \times f_0$ where n is an integer defining the order of the harmonic considered,
A first electronic circuit arranged at the output of the RFID reader to take an image of said interrogation signal,
A second electronic circuit, operationally connected to the first electronic circuit, to generate a signal at the frequency $(n-1) \times f_0$ from the image of the interrogation signal, and
A third electronic circuit, operationally connected to the second electronic circuit and to the RF antenna of the complementary device, to generate a backscattered signal converted downwards, from the response signal backscattered at the harmonic frequency $n \times f_0$ and according to the signal at the frequency $(n-1) \times f_0$ generated before, the backscattered signal converted downwards being generated, so as to be returned to the fundamental frequency $f_0$ and to be injected, directly or indirectly, at the input of the RFID reader for processing, such that the RFID reader can extract information carried by the backscattered response signal.

2. The complementary device according to claim 1, further comprising, when the backscattered signal converted downwards is to be injected indirectly at the input of the RFID reader for processing, an electronic combiner operationally connected to the third electronic circuit and arranged at the input of the RFID reader to:
receive, from an RF antenna of the RFID reader, a response signal backscattered at the fundamental frequency $f_0$ by the interrogated transponder,
combine the response signal backscattered at the fundamental frequency $f_0$ and the backscattered signal converted downwards, and
inject the signal resulting from the combination at the input of the RFID reader for processing.

3. The complementary device according to claim 2, wherein the electronic combiner is configured for a weighted combination in module and/or in phase of the response signal backscattered at the fundamental frequency $f_0$ and of the backscattered signal converted downwards.

4. The complementary device according to claim 2, wherein the electronic combiner is configured for a combination by alternating of the response signal backscattered at the fundamental frequency $f_0$ and of the backscattered signal converted downwards.

5. The complementary device according to claim 1, wherein the first electronic circuit comprises an electronic coupler.

6. The complementary device according to claim 1, wherein the second electronic circuit successively comprises:
An electronic frequency multiplier operationally connected to an output of the first electronic circuit and configured to multiply the frequency of the image of the interrogation signal by a factor equal to n−1,
An electronic amplifier to amplify the image of the multiplied interrogation signal,
A first bandpass filter configured to filter the image of the multiplied and amplified interrogation signal such as multiplied and amplified before, by letting a frequency interval pass, centred on the frequency $(n-1) \times f_0$, and
A bandstop filter configured to filter the image of the multiplied, amplified and filtered interrogation signal, by not letting a frequency interval pass, centred on the fundamental frequency $f_0$.

7. The complementary device according to claim 1, wherein the third electronic circuit comprises at the output, an electronic amplifier to amplify the output signal of the third electronic circuit, an output of the electronic amplifier being connectable, directly or indirectly, at the input of the RFID reader.

8. The complementary device according to claim 7, wherein the third electronic circuit comprises a second bandpass filter configured to filter the signal passing through the third electronic circuit, by letting a frequency interval pass, centred on the fundamental frequency $f_0$ and successively comprises:
A low noise electronic amplifier operationally connected to the RF antenna of the complementary device and configured to amplify the response signal backscattered at the harmonic frequency $n \times f_0$,
A third bandpass filter configured to filter the amplified response signal backscattered at the harmonic frequency $n \times f_0$, by letting a frequency interval pass, centred on the frequency $n \times f_0$,
A bandstop filter configured to filter the amplified and filtered response signal backscattered at the harmonic frequency $n \times f_0$, by not letting a frequency interval pass, centred on the fundamental frequency $f_0$,
An electronic mixer operationally connected to an output of the second electronic circuit and configured to combine the amplified and double filtered response signal backscattered at the harmonic frequency $n \times f_0$, and the image of the multiplied, amplified and filtered interrogation signal,
The second bandpass filter configured to filter the output signal of the electronic mixer, and
The electronic amplifier to amplify the filtered output signal of the electronic mixer such as filtered before.

9. The complementary device according to claim 1, wherein the third electronic circuit comprises a second bandpass filter configured to filter the signal passing through it the third electronic circuit, by letting a frequency interval pass, centred on the fundamental frequency $f_0$.

10. The complementary device according to claim 1, wherein the integer n is equal to 3, such that the harmonic frequency $n \times f_0$ corresponds to the third harmonic backscattered signal.

11. An RFID reader operating at the fundamental frequency $f_0$ and comprising a complementary RFID communication device according to claim 1 to enable the detection and the processing of at least one harmonic signal backscattered by an interrogated RFID transponder, so as to extract information carried by the backscattered harmonic signal.

12. An RFID communication system comprising an RFID reader according to the claim 11 and a plurality of RFID transponders.

\* \* \* \* \*